US010826197B2

(12) United States Patent
Yu et al.

(10) Patent No.: US 10,826,197 B2
(45) Date of Patent: Nov. 3, 2020

(54) PHASED ARRAY ANTENNA MODULE AND COMMUNICATION DEVICE INCLUDING THE SAME

(71) Applicant: SAMSUNG ELECTRONICS CO., LTD., Suwon-si, Gyeonggi-Do (KR)

(72) Inventors: Hyun-seok Yu, Seoul (KR); Sang-won Son, Palo Alto, CA (US); Siu-chuang Ivan Lu, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

(21) Appl. No.: 16/410,078

(22) Filed: May 13, 2019

(65) Prior Publication Data

US 2019/0363453 A1  Nov. 28, 2019

Related U.S. Application Data

(60) Provisional application No. 62/675,931, filed on May 24, 2018.

(30) Foreign Application Priority Data

Jun. 29, 2018  (KR) .................. 10-2018-0075949

(51) Int. Cl.
*H01Q 21/00* (2006.01)
*H01Q 21/06* (2006.01)
*H01Q 1/22* (2006.01)
*H04B 7/0413* (2017.01)
*H01Q 3/26* (2006.01)
*H01Q 3/30* (2006.01)
*H01Q 21/24* (2006.01)

(52) U.S. Cl.
CPC ......... *H01Q 21/067* (2013.01); *H01Q 1/2283* (2013.01); *H04B 7/0413* (2013.01); *H01Q 3/26* (2013.01); *H01Q 3/30* (2013.01); *H01Q 21/24* (2013.01); *H01Q 21/245* (2013.01)

(58) Field of Classification Search
CPC ...... H01Q 21/00; H01Q 21/24; H01Q 21/245; H01Q 3/26; H01Q 3/30
See application file for complete search history.

(56) References Cited

U.S. PATENT DOCUMENTS

| 7,812,775 | B2 | 10/2010 | Babakhani et al. |
| 8,818,457 | B2 | 8/2014 | Besoli et al. |
| 8,838,036 | B2 | 9/2014 | Yoon et al. |
| 9,281,979 | B2 | 3/2016 | Maltsev et al. |
| 9,537,224 | B2 | 1/2017 | Friedman et al. |

(Continued)

*Primary Examiner* — Thuy Vinh Tran
(74) *Attorney, Agent, or Firm* — F. Chau & Associates, LLC

(57) ABSTRACT

Provided is an antenna module including: a phased array having a plurality of antennas and configured to communicate a first RF signal and a second RF signal, which are polarized in different directions; a front-end radio frequency integrated circuit (RFIC) including a first RF circuit configured to process or generate the first RF signal and a second RF circuit configured to process or generate the second signal; and a switch circuit configured to connect each of the first RF circuit and the second RE circuit to a first port or a second port of the antenna module according to a control signal. The first and second ports are each connectable to a back end RFIC that processes or generates a baseband signal.

20 Claims, 11 Drawing Sheets

(56) References Cited

U.S. PATENT DOCUMENTS

| | | |
|---|---|---|
| 9,634,389 B2 * | 4/2017 | Tseng .................... H01Q 3/385 |
| 2012/0235881 A1 | 9/2012 | Pan et al. |
| 2013/0072136 A1 | 3/2013 | Besoli et al. |
| 2015/0214633 A1 | 7/2015 | Pan |
| 2017/0033848 A1 | 2/2017 | Cordeiro et al. |
| 2017/0294705 A1 | 10/2017 | Khripkov et al. |
| 2017/0353338 A1 | 12/2017 | Amadjikpe et al. |
| 2019/0173167 A1 * | 6/2019 | Ariumi ................ H01Q 19/005 |
| 2019/0229421 A1 * | 7/2019 | Onaka .................. H01Q 13/106 |

* cited by examiner

PHASED ARRAY ANTENNA MODULE AND COMMUNICATION DEVICE INCLUDING THE SAME

CROSS-REFERENCE TO RELATED APPLICATIONS

This application claims the benefit of U.S. Provisional Application No. 62/675,931, filed on May 24, 2018, in the US Patent and Trademark Office, and to Korean Patent Application No. 10-2018-0075949, filed on Jun. 29, 2018, in the Korean Intellectual Property Office, the disclosures of which are incorporated herein by reference in their entireties.

TECHNICAL FIELD

The inventive concept relates generally to wireless communication, and more particularly, to a phased array antenna module and a communication device including the same.

Discussion of Related Art

A wireless communication device may support a multi-input and multi-output (MIMO) system for high throughput and/or improved signal quality. These systems may support a diversity scheme involving the selection of an optimum antenna(s) or beam direction depending on the signal environment. To this end, a device may include an antenna module including a plurality of antennas that form a phased array in which the relative phase between antennas is determinative of beam direction, allowing for beam steering and communication with an improved signal. MIMO may further entail multiplexing to increase throughput, where independent information signals, or signals representing different portions of a bit stream, are transmitted/received concurrently at different beam directions.

To support a high frequency band having a strong linearity characteristic such as millimeter waves (mmWave), in which the waves don't efficiently bend around or pass through certain obstacles, the wireless communication device may include a plurality of antenna modules. Each antenna module may itself include a phased array. The antenna modules are spaced apart from each other such that communication of a signal is enabled through a selected one, or a group of, antenna modules. For example, when communication using an initially selected antenna module is interrupted by an obstacle or changed orientation facing direction of the wireless communication device, communication may be switched to a different antenna module or modules communicating with better signal quality. Accordingly, a structure for efficiently processing signals received through a plurality of antenna modules and signals transmitted through a plurality of antenna modules is desirable.

SUMMARY

Embodiments of the inventive concept provide an antenna module for efficiently processing signals, and a communication device including the antenna module.

According to an aspect of the inventive concept, there is provided an antenna module including: a phased array including a plurality of antennas and configured to communicate a first RF signal and a second RF signal, which are polarized in different directions; a front-end radio frequency integrated circuit (RFIC) including a first RF circuit configured to process or generate the first RF signal and a second RF circuit configured to process or generate the second RF signal; and a switch circuit configured to connect each of the first RF circuit and the second RF circuit to a first port or a second port of the antenna module according to a control signal. The first and second ports are connectable to a back-end RFIC that processes or generates a baseband signal.

According to another aspect of the inventive concept, there is provided a communication device including: a first signal line and a second signal line; a back-end radio frequency integrated circuit (RFIC) configured to process or generate a baseband signal; and a first antenna module connected to the back-end RFIC through the first signal line and the second signal line and including a phased array configured to communicate a first RF signal and a second RF signal polarized in different directions, wherein the first antenna module is configured to communicate with the back-end RFIC such that a first internal signal corresponding to the first RF signal and a second internal signal corresponding to the second RF signal each pass through the first signal line or the second signal line according to a control signal.

According to another aspect of the inventive concept, there is provided a communication device including: a back-end radio frequency integrated circuit (RFIC) configured to process or generate a baseband signal; and first through third antenna modules each including a phased array configured to communicate a first RF signal and a second RF signal polarized in different directions, wherein the back-end RFIC includes first through fourth 4-way switches, the first antenna module is connected to a second port of the first 4-way switch and a first port of the second 4-way switch, the second antenna module is connected to a second port of the second 4-way switch and a first port of the third 4-way switch, and the third antenna module is connected to a second port of the third 4-way switch and a second port of the fourth 4-way switch.

BRIEF DESCRIPTION OF THE DRAWINGS

Embodiments of the inventive concept will be more clearly understood from the following detailed description taken in conjunction with the accompanying drawings in which like reference characters denote like elements or operations, wherein.

DETAILED DESCRIPTION OF EMBODIMENTS

Illustrative embodiments of the inventive concept will now be described with reference to the drawings.

Herein, the term phased array may refer to at least two antennas that collectively communicate (i.e., transmit and/or receive) one or more information signals. In a phased array, insertion phase of signal paths connected to the antennas are set or dynamically adjusted to generate a beam that points in a desired direction. The term phased array as used herein may also refer collectively to at least two sets of antennas disposed within the same antenna module, where each antenna set comprises plural antenna elements. In this case, a first antenna set of the phased array may be used to communicate signal energy polarized in a first direction and a second antenna set may be used to communicate signal energy polarized in a second direction.

Herein, the terms antenna element and antenna may be used interchangeably.

Herein, when an antenna is said to communicate a signal, the antenna transmits and/or receives the signal.

Herein, the term radio frequency (RF) is used to encompass frequencies ranging from the kHz range to mmWave frequencies.

Herein, the words "transmit" and "receive" may be used as adjectives. For instance, "a receive signal" refers to a signal being received, "a transmit signal" refers to a signal being transmitted, "receive signal power" refers to power of a receive signal, etc.

Figure 1:
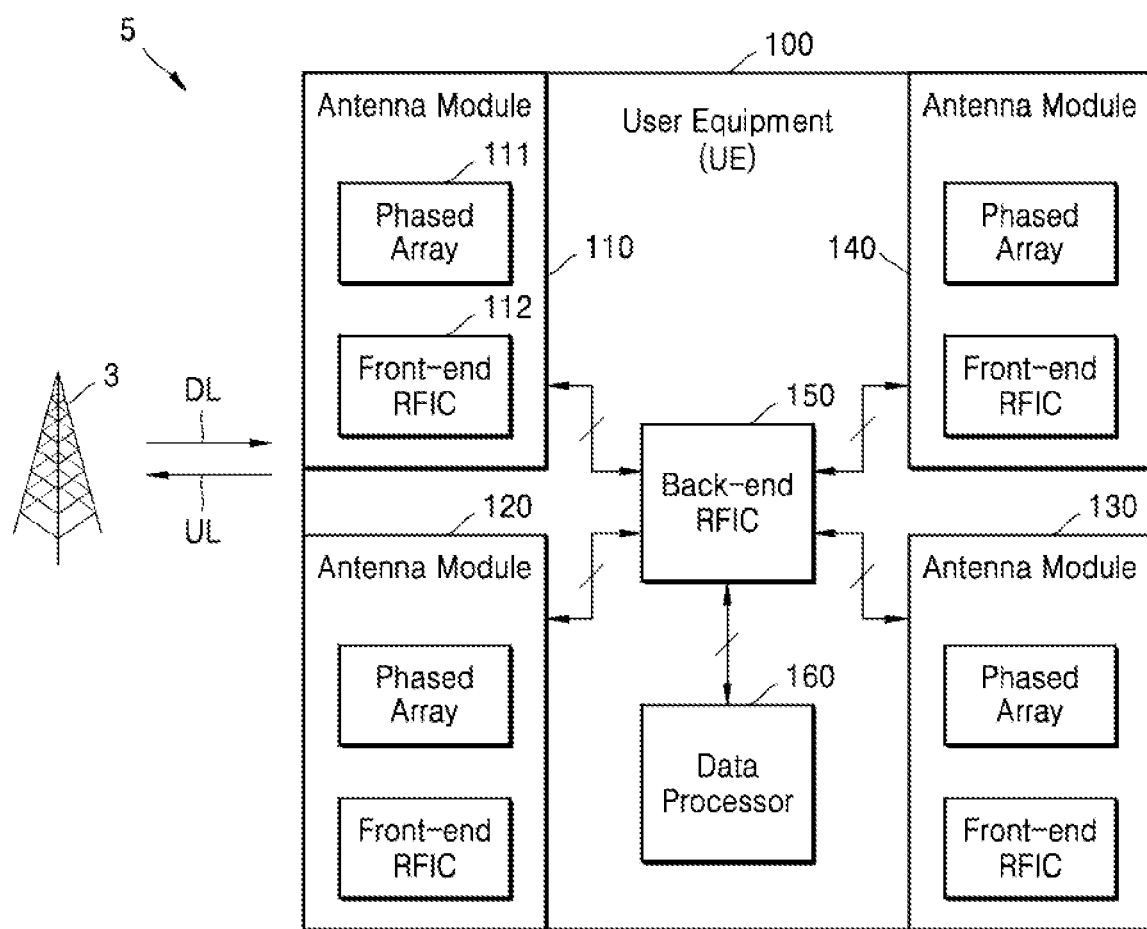
FIG. 1 is a block diagram of a wireless communication system including a communication device, according to an embodiment.

FIG. 1 is a block diagram of a wireless communication system, 5, including a communication device according to an embodiment. The wireless communication system 5 may include a wireless communication system using a cellular network, such as a 5$^{th}$ generation wireless (5G) system, a long term evolution (LTE) system, an LTE-advanced system, a code division multiple access (CDMA) system, a global system for mobile communication (GSM) system, a wireless local area network WLAN) system, or another type of wireless communication system. Hereinafter, the wireless communication system 5 will be described mainly as a wireless communication system using a cellular network, but embodiments involving non-cellular networks are also possible. As shown in FIG. 1, in the wireless communication system 5, wireless communication devices, i.e., a base station (BS) 3 and user equipment (UE) 100, may communicate with each other. Herein, a wireless communication device may also be referred to as a communication device.

The BS 3 may generally denote a fixed station communicating with a UE and/or another BS and may exchange data and control information by communicating with the UE and/or the other BS. For example, the BS 3 may be a Node B, an evolved-Node B (eNB), a sector, a site, a base transceiver system (BTS), an access point (AP), a relay node, a remote radio head (RRH), a radio unit (RU), or a small cell. In the present disclosure, a "cell" has a comprehensive meaning that indicates a partial region or function, e.g., covered by a base station controller (BSC) in CDMA, a Node B in WCDMA, an eNB or sector (site) in LTE. Examples of a cell's range include various coverage regions such as mega-cell, macro-cell, micro-cell, pico-cell, femto-cell, relay node, RRH, RU, and small cell communication ranges.

The UE 100 may be fixed or mobile and denote any device capable of transmitting or receiving data and/or control information by communicating with the BS 3. For example, the UE 100 may be terminal equipment, a mobile station (MS), a mobile terminal (MT), a user terminal (UT), a subscriber station (SS), a wireless device, or a handheld device.

A wireless communication network between the UE 100 and the BS 3 may support communication between users by sharing available network resources. For example, in the wireless communication network, information may be transferred via various multiple access methods, such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. As shown in FIG. 1, the UE 100 and the BS 3 may communicate with each other through an uplink UL and a downlink DL. According to some embodiments, user devices may communicate with each other through a sidelink as in device-to-device (D2D).

As shown in FIG. 1, the UE 100 may include a plurality of antenna modules 110, 120, 130 and 140, a back-end radio frequency integrated circuit (RFIC) 150, and a data processor 160. The antenna modules 110-140 may communicate with the back-end RFIC 150, and the back-end RFIC 150 may communicate with the data processor 160. in FIG. 1, the UE 100 includes four antenna modules 110 through 140, but more or fewer antenna modules may be employed in alternative examples.

A signal having a short wavelength may have strong linearity in a high frequency band such as a millimeter wave band, and accordingly may be easily attenuated by an obstacle. With short wavelength signals, signal power received through an antenna may be diminished when the antenna pointing direction or orientation/polarization is misaligned with that of the incoming signal. A reciprocal condition may occur on transmit. The UE 100 may include the plurality of antenna modules 110-140, which may be spaced apart from one another as seen in FIG. 1. Receive power may differ at the respective locations of the antenna modules 110-140. Differences in receive power may be due to differences in multi-path reflections at the different respective locations of the antenna modules, e.g., which cause changes in polarization of the incoming signal. Further, each antenna module may be preset to form a beam in a different respective direction such that all the antenna modules 110-140 together cover a wider area. By dynamically selecting one or more of the antenna modules 110-140 having a high quality signal, communication with the BS 3 is still possible despite a non-optimum pointing direction of the UE 100 or the proximity of an obstacle, such as a user's body. In an example, the antenna modules 110-140 may be spaced apart from each other along an edge of the UE 100. For instance, if UE 100 has a profile in the general shape of a rectangle, the antenna modules 110-140 may each be mounted at a respective corner of the rectangle.

Each of the antenna modules 110-140 may include a phased array. For example, the antenna module 110 may include a phased array 111 comprised of a plurality of antennas. The plurality of antennas of the phased array 111 may be used to collectively form a beam according to some embodiments, and may be used for a MIMO based communication scheme. For instance, using MIMO, the antenna modules 110-140 may together be used to concurrently communicate a plurality of independent signals occupying the same frequency band, but propagating in different directions, thereby increasing throughput. Also, according to some embodiments, the phased array 111 may include an antenna configured to communicate a signal polarized in a pre-determined direction, or may include an antenna configured to simultaneously transmit or receive at least two signals polarized in different directions.

Each of the antenna modules 110-140 may include a front-end RFIC. For example, the antenna module 110 may include a front-end RFIC 112 which may be coupled to a plurality of antennas of the phased array 111. The front-end RFIC 112 may provide, to the back-end RFIC 150, a signal generated by processing signals received from the phased array 111 in a reception mode, or provide, to the phased array 111, a signal generated by processing a signal received from the back-end RFIC 150 in a transmission mode.

The back-end RFIC 150 may process or generate a baseband signal. For example, the back-end RFIC 150 may receive a baseband signal from the data processor 160 and provide a signal generated by processing the baseband signal to at least one of the antenna modules 110-140. Further, the back-end RFIC 150 may provide a baseband signal generated by processing a signal received from at least one of the antenna modules 110-140 to the data processor 160.

The data processor 160 may generate a baseband signal based on data to be transmitted to the BS 3 and provide the baseband signal to the back-end RFIC 150, or may extract data received from the BS 3 from a baseband signal received from the back-end RFIC 150. For example, the data processor 160 may include at least one digital-to-analog converter (DAC) that outputs a baseband signal by converting digital data modulated from data to be transmitted to the BS 3. The data processor 160 may also include at least one analog-to-digital converter (ADC), wherein the at least one ADC may output digital data by converting a baseband signal. According to some embodiments, the data processor 160 may include at least one core executing a series of instructions and may be referred to as a modem.

As described above, a phased array (for example, the phased array 111) included in one antenna module may communicate a plurality of signals such as signals with different polarizations, and since the UE 100 may include the plurality of antenna modules 110-140, this may increase the number of connections between the plurality of antenna modules 110-140 and the back-end RFIC 150. When the back-end RFIC 150 has an increased number of pins due to the increased number of connections, both the size of the back-end RFIC 150 may increase, and a higher number of components corresponding to the connections may be provisioned. Also, when the number of signal lines is increased between the plurality of antenna modules 110-140 and the back-end RFIC 150, the structure of the UE 100 may become complicated, and space efficiency of the UE 100 may suffer due to the allocation of space for the arrangement of the signal lines. As a result, miniaturization of the UE 100 may be restricted. In accordance with the inventive concept as explained further below, such an increase in the number of connections and components may be mitigated.

Some of a plurality of signals corresponding to the phased arrays of the antenna modules 110-140 may be used for communication with the BS 3. For example, an antenna module among the antenna modules 110-140, which provides unsatisfactory communication due to an obstacle and/ or the facing direction of the UE 100, may be excluded from communication with the BS 3. Also, when communication through a signal polarized in a certain direction is unsatisfactory, communication of the signal may be excluded. As will be described below, the antenna modules 110-140 and the back-end RFIC 150 may be connected to each other in the UE 100 such that some of a plurality of signals corresponding to the antenna modules 110-140 are omitted while signals selected for communication are processed. For example, the omitted signals are not routed to/from the back-end RFIC 150. Accordingly, the number of connections between the antenna modules 110-140 and the back-end RFIC 150, otherwise dedicated to always route every signal, may be decreased in the UE 100, and the UE 100 may have a simpler structure. Further, for a given number of connections, the UE 100 may support an increased number of MIMO streams, and consequently the UE 100 may provide a higher data transmission rate. Hereinafter, one or more embodiments will be described mainly of the UE 100 as an example of a communication device, but it will be understood that other embodiments may be applied to different types of communication devices, such as the BS 3.

Figure 2:
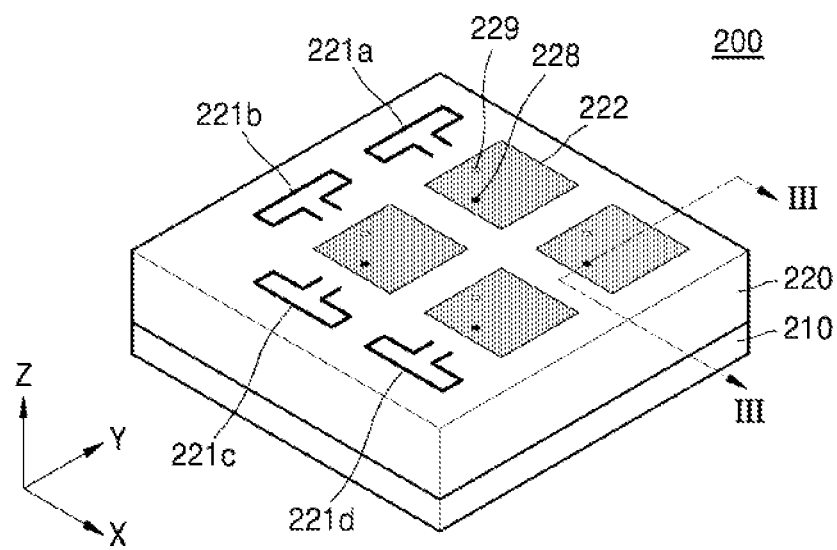
FIG. 2 is a perspective view of an antenna module according to an embodiment.
Figure 3:
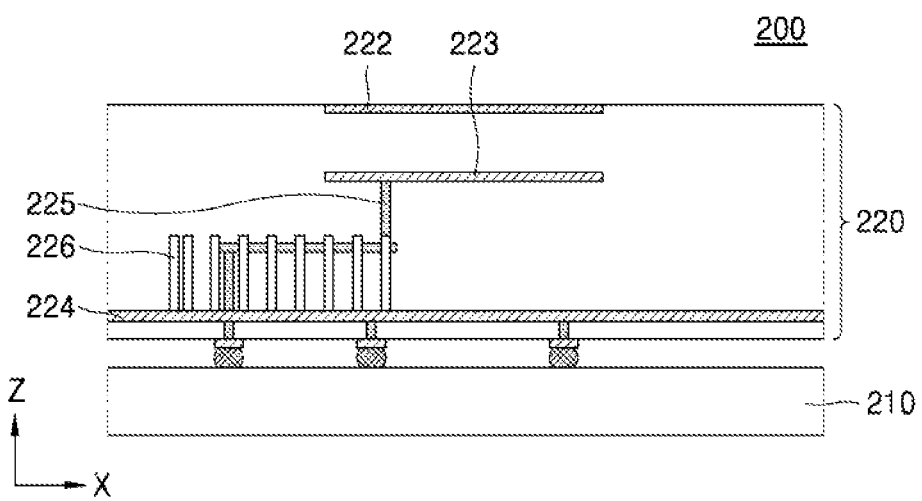
FIG. 3 is a cross-sectional view of a part of an antenna module taken along the lines III-III of FIG. 2, according to an embodiment.

FIG. 2 is a perspective view of an antenna module 200 according to an embodiment. FIG. 3 is a cross-sectional view of a part of the antenna module 200, taken along the lines III-III of FIG. 2, according to an embodiment. In particular, FIG. 3 is a cross-sectional view in which the antenna module 200 of FIG. 2 is cut in the Z-Y plane, where the Z axis is perpendicular to a major surface of the antenna module 200.

For instance, referring to FIGS. 1 and 2, the antenna module 200 is an example of any of the antenna modules 110-140, and may be mounted within the UE 100 such that its top surface (major surface) is parallel to the major surface (e.g., a front face) of the UE 100. The thickness direction of the antenna module 200 may coincide with the thickness direction of the UE 100. In this case, if the user holds the device with its front face facing vertically (e.g., the UE is placed on a flat surface face up), the following convention may correspond to this orientation state: an X-axis direction and a Y-axis direction, which are perpendicular to each other, may be respectively referred to as a first horizontal direction and a second horizontal direction, and the X-Y plane may be referred to as a horizontal plane. Also, a direction perpendicular to the horizontal plane, i.e., a Z-axis direction may be referred to as a vertical direction, wherein components arranged in a +Z-axis direction relative to other components may be referred to as being above the other components, and components arranged in a −Z-axis direction relative to other components may be referred to as being below the other components. Among surfaces of a component, a surface in the +Z-axis direction may be referred to as a top surface and a surface in the −Z-axis direction may be referred to as a bottom surface. Note that the antenna module 200 in FIGS. 2 and 3 are only examples, and other suitable configurations may be substituted.

As described above with reference to FIG. 1, the antenna module 200 may include a phased array 220 including a plurality of antennas, and a front-end RFIC 210. According to some embodiments, the antenna module 200 may be manufactured via semiconductor processes, and as shown in FIG. 2, the phased array 220 may be provided on the front-end RFIC 210. For example, the antenna module 200 may include first and second substrates in a stacked configuration. The phased array 220 may be provided on or within the first substrate and the front-end RFIC 210 may be provided on or within the second substrate. Since most loss parameters may deteriorate in a high frequency band, such as a mmWave band, it may be difficult to internally package a layout of an antenna module used in a relatively low frequency band, such as a band lower than 6 GHz. In particular, the phased array 220 and the front-end RFIC 210 may be arranged in a sandwich structure as shown in FIG. 2, so as to reduce signal attenuation caused by a feed line supplying a signal to an antenna or extracting a signal from an antenna. As shown in FIG. 2, a structure in which antennas, i.e., the phased array 220, are arranged on the front-end RFIC 210 may be referred to as a system-in-package (SiP) structure.

Referring to FIG. 2, the phased array 220 may include patches 222 (also called "patch antennas") and dipole antennas 221a, 221b, 221c and 221d. For example, each of the patches 222 may irradiate electromagnetic waves in the +Z-axis direction or absorb electromagnetic waves in the −Z-axis direction, while the dipole antennas 221a-221d may expand coverage of the phased array 220. Arrangements of patch antennas and dipole antennas in FIG. 2 are only examples. As a minimum, each phased array 220 includes at least two antenna elements so that a phased relationship between the antenna elements may be exploited to form a beam in a desired direction. Further, at least one of the antenna elements of each phased array 220 may be driven or arranged to have a different polarization than that of at least one other antenna element of that phased array 220. As noted earlier, each antenna module 110-140 may be designed to form a beam in a different respective direction, which may be realized through different relative phase relationships among the antenna elements.

For instance, in the example of FIGS. 1 and 2, any of the patches 222 may be driven at a first feed point 228 near a first side edge of the patch to generate a beam with a first polarization in the Y direction, if the patch is driven at a second feed point 229 near a second side edge of the patch (the second side being perpendicular to the first side), the resulting beam may have a second polarization, which is in the X direction (an orthogonal direction). At least one of the patches 222 of a given phased array 220 may be driven to transmit/receive with the first polarization while at least one of the other patches 222 may be driven to transmit/receive with the second polarization. As explained later, each antenna module 200 may include a power detector (e.g. power detector 911 of FIG. 9) to measure the RF power received at each of the first and second polarizations. The polarization with the superior signal may then be selected to provide a receive and/or transmit signal for that antenna module 200, while the signal for the non-selected polarization may not be used. Note that the first and second polarizations may be orthogonal polarizations, as in the above example, but they may be non-orthogonal in other embodiments.

In the example structure of antenna module 200, the dipoles 221a, 221b are oriented parallel to a first axis (e.g. the Y axis) and the dipoles 221c, 221d are oriented along a second axis (e.g., the X axis). In an example, if the UE 100 is held by a user with its front face facing substantially horizontally, the top surface of the antenna module 200 may face horizontally. If the antenna module 200 is mounted in a corner of the UE 100, the dipoles 221a and 221b may be oriented horizontally and thereby generate horizontal polarization, while the dipoles 221c, 221d are oriented vertically and thereby generate vertical polarization. Accordingly, polarization diversity may be achievable using the dipoles 221a-221d in this type of arrangement.

Referring to FIG. 3, in the phased array 220, each patch 222 may be a top patch, which is electromagnetically driven via a bottom patch 223. Alternatively, only a single, top patch may be included and directly driven by an antenna feed 225 that extends directly thereto (where such a direct connection embodiment is not shown in FIG. 3). In the case of FIG. 3, the top and bottom patches 222, 223 may be spaced apart from each other parallel in the Z-axis direction, and may irradiate electromagnetic waves in the +Z-axis direction. The top patch 222 and the bottom patch 223 may include a conductive material, such as a metal, and may have a rectangular shape as shown in FIG. 2, or may have a circular or other shape. As shown in FIG. 3, the phased array 220 may further include a ground plate 224 below the bottom patch 223, and according to some embodiments. Also, the phased array 220 may include the feed line 225 and a plurality of buried vias 226. The feed line 225 may be connected to the bottom patch 223 while the plurality of buried vias 226 may be configured such that constant potential is applied thereto and may be connected to, for example, the ground plate 224 as shown in FIG. 3.

The front-end RFIC 210 may be mounted on a bottom surface of the phased array 220, and the front-end RFIC 210 may be electrically connected to the bottom patch 223 through the feed line 225. According to some embodiments, the phased array 220 and the front-end RFIC 210 may be connected to each other through a controlled collapse chip connection (C4). The structure of the antenna module 200 of FIGS. 2 and 3 is only an example; other suitable structures may be substituted therefor.

Figure 4:
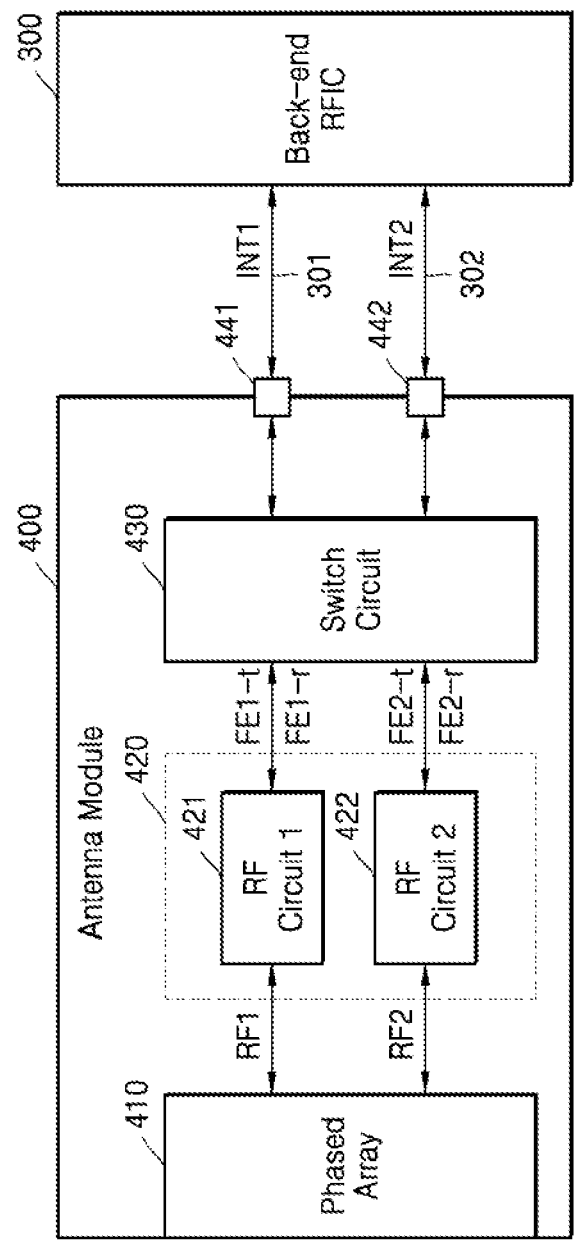
FIG. 4 is a block diagram of an antenna module and a back-end radio frequency integrated circuit (RFIC), according to an embodiment.

FIG. 4 is a block diagram of an antenna module 400 and a back-end RFIC 300, according to an embodiment. The antenna module 400 is an example of any of the antenna modules 110-140 and 200, and the back-end RFIC 300 is an example of RFIC 150. As shown in FIG. 4, the antenna module 400 and the back-end RFIC 300 may communicate with each other through a first signal line 301 and a second signal line 302, and according to some embodiments, each of the first and second signal lines 301 and 302 may include a differential line for transmitting a differential signal. Each of the first signal line 301 and second signal line 302 may be one conductor of a transmission line, such as microstrip or stripline (the other conductor being ground plane), where signal energy propagates within the transmission line between the antenna module 400 and the back-end RFIC 300. (In the case of a microstrip line or other transmission line, although the signal energy typically propagates within dielectric material between the signal line and the other conductor of the transmission line, e.g., a ground plane of microstrip, a signal may be said herein to travel between components on opposite ends of the transmission line by "passing through" the signal line.)

The antenna module 400 may include a first port 441 connected to the first line 301 and a second port 442 connected to the second line 302. A signal transmitted through the first port 441 and the first line 301 may be referred to as a first internal signal INT1, and a signal transmitted through the second port 442 and the second line 302 may be referred to as a second internal signal INT2. According to some embodiments, each of the first internal signal INT1 and the second internal signal INT2 may be a differential signal, and each of the first port 441 and the second port 442 may be a differential port for a differential signal. As described above with reference to FIG. 1, the antenna module 400 may include a phased array 410 (an example of phased array 111 or 220) and a front-end RFIC 420 (an example of the front-end RFIC 112 or 210), and may further include a switch circuit 430. According to some embodiments, when the antenna module 400 has an SiP structure as described with reference to FIGS. 2 and 3, the switch circuit 430 may be arranged below the phased array 220 together with the front-end RFIC 210 of FIG. 2. Herein, a switch circuit may interchangeably be referred to as a switch. Also, the antenna module 400 may include the first and second ports 441 and 442 and may be connected to the back-end RFIC 300 through the first and second ports 441 and 442.

The phased array 410 includes a plurality of antennas and may communicate a first RF signal RF1 polarized in a first direction and a second RF signal RF2 polarized in a second direction. In the discussion that follows, for simplicity, the first direction may be referred to as a horizontal direction and the first RF signal RF1 may be referred to as a horizontal (H) wave; and the second direction may be referred to as a vertical direction and the second RF signal RF2 may be referred to as a vertical (V) wave. Each of the first and second RF signals RF1 and RF2 may be a modulated carrier wave occupying the same RF band. (Hereafter, the labels RF1 and RF2 may each refer to either a receive signal or a transmit signal, as understood from the context in which they are used.)

The front-end RFIC 420 may include a first RF circuit 421 and a second RF circuit 422. The first RF circuit 421 may generate a first front-end receive signal FE1-r by processing the first RF signal RF1 received from the phased array 410 in a reception mode and generate the first RF signal RF1 by processing a first transmit front-end signal FE1-t received from the switch circuit 430 in a transmission mode. Similarly, the second RF circuit 422 may generate a second receive front-end signal FE2-r by processing the second RF signal RF2 received from the phased array 410 in a reception mode and generate the second RF signal RF2 by processing a second front-end signal FE2-t received from the switch circuit 430 in a transmission mode. An example of the front-end RFIC 420 will be described later with reference to FIGS. 6A and 6B. Hereafter, for simplicity, "FE1" will be used to refer to either the transmit signal FE1-t or the receive signal FE1-r, or to both of these signals; and "FE2" will be used to refer to either the transmit signal FE2-t or the receive signal FE2-r, or to both of these signals.

The switch circuit 430 may connect each of the first and second RF circuits 421 and 422 to the first port 441 or the second port 442 according to a control signal. According to some embodiments, the switch circuit 430 may mutually exclusively connect the first and second RF circuits 421 and 422 to the first and second ports 441 and 442 according to a control signal. For example, the switch circuit 430 may include a 4-way switch, which may be a switch having two switching states. In a first switching state ("straight-path state") of the 4-way switch, the first front-end signal FE1 provided to/output from the first RF circuit 421 passes through the first port 441, and the second front-end signal FE2 provided to/output from the second RF circuit 422 passes through the second port 442. In a second switching state ("crossed state") of the 4-way switch, the inputs and outputs of the switch circuit 430 are crossed, so that the first front-end signal FE1 passes through the second port 442 and the second front-end signal FE2 passes through the first port 441. The first and second switching states of the switch circuit 430 may result from first and second control states of the control signal, respectively. Examples of an operation of the switch circuit 430 will be described later with reference to FIGS. 5A and 5B. According to some embodiments, the 4-way switch may include a plurality of 2-way switches that are hierarchically connected. Optionally, switch circuit 430 may be additionally configured to have third and fourth switching states, corresponding to third and fourth control states of the control signal, respectively. In each of these states, one of the signal paths is open while the other one is closed. In the third switching state, the first front-end signal FE1 passes through the first port 441 while the signal FE2 does not pass through the switch. In the fourth switching state, the signal FE2 passes to the second port 442 while the signal FE1 does not pass through the switch. Fifth and sixth states may also be configured, in which signal FE1 passes to the second port 442 while signal FE2 does not pass through the switch (fifth state); and in the sixth state, signal FE2 passes to the first port 441 while signal FE1 does not pass through the switch.

As described above, a signal polarized in a certain direction may be transmitted through different lines according to a control signal instead of being transmitted through a line pre-determined among lines connected to the antenna module 400 and the back-end RFIC 300, and accordingly, the antenna module 400 and the back-end RFIC 300 may communicate with each other efficiently through a limited number of lines. For example, signals of a polarization determined to be inefficiently received (or which will be inefficiently transmitted) may be prevented from being exchanged between the antenna module 400 and the back-end RFIC 300 (e.g. by terminating the unwanted signals). With this approach, a number of signal lines may be reduced as compared to related art designs in which every signal from/to every antenna is continually exchanged with a back-end RFIC. The switch circuit 430 may include a plurality of transistors and may have an arbitrary structure that changes a path of a signal according to a control signal. As will be described later with reference to FIG. 9, a control signal for controlling the switch circuit 430 may be provided by a data processor, for example, the data processor 160 of FIG. 1.

In FIG. 4, the antenna module 400 and the back-end RFIC 300 may process the first and second RF signals RF1 and RF2, which are polarized in two different directions. In other embodiments, the antenna module 400 and the back end RFIC 300 may process at least three RF signals polarized in different directions. For example, to process the at least three RF signals polarized in different directions, the front-end RFIC 420 may include three independent RF circuits, and the switch circuit 430 may connect each of the three RF circuits to one of three ports connected to the back-end RFIC 300 according to a control signal.

Figure 5A:
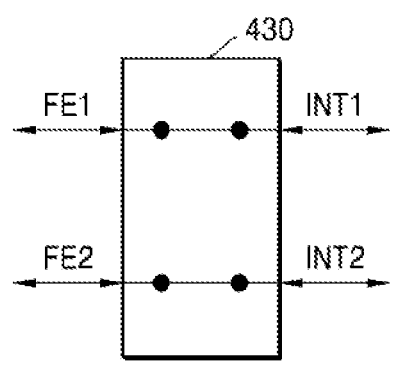
FIGS. 5A and 5B are diagrams showing respective switching states of an operation of a switch circuit of FIG. 4, according to embodiments.
Figure 5B:
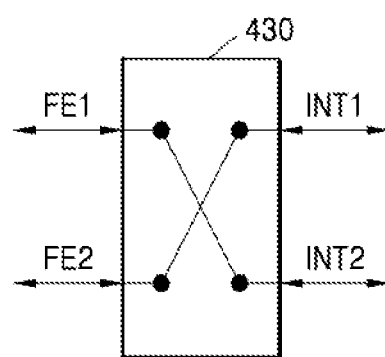

FIGS. 5A and 5B are diagrams showing respective switching states of an operation of the switch circuit 430 of FIG. 4, according to embodiments. In particular, FIGS. 5A and 5B illustrate signals passing through the switch circuit 430 according to a control signal. As described above with reference to FIG. 4, the switch circuit 430 may connect each of the first and second RF circuits 421 and 422 to the first or second port 441 or 442 according to a control signal. Hereinafter, FIGS. 5A and 5B are described with reference to FIG. 4.

According to some embodiments, the switch circuit 430 may mutually exclusively connect the first and second RF circuits 421 and 422 to the first and second ports 441 and 442 according to a control signal. Referring to FIG. 5A, in the first switching state, (straight-path state) of the switch circuit 430, may form signal paths such that the first front-end signal FE1 and the first internal signal INT1 correspond to each other and the second front-end signal FE2 and the second internal signal INT2 correspond to each other. Accordingly, the first Rh circuit 421 may be connected to the first port 441 while the second RF circuit 422 may be connected to the second port 442. Meanwhile, referring to FIG. 5B, in the second switching state (crossed state) of the switch circuit 430, signal paths are formed such that the first front-end signal FE1 and the second internal signal INT2 correspond to each other and the second front-end signal FE2 and the first internal signal INT1 correspond to each other. Accordingly, depending on the control signal applied to the switch circuit 430, the first front-end signal FE1 may correspond to the first or second internal signals INT1 or INT2, and concurrently, the second front-end signal FE2 may correspond to the second or first internal signals INT2, INT1, respectively. As discussed above, switch circuit 430 may be additionally configured to have third, fourth, fifth and/or sixth switching states, in which only one of the input signals FE1 or FE2 passes through the switch to a selected output port, and the other signal does not pass through the switch, where the selected signal that passes and the selected output port may be determined by another control state of the control signal.

Figure 6A:
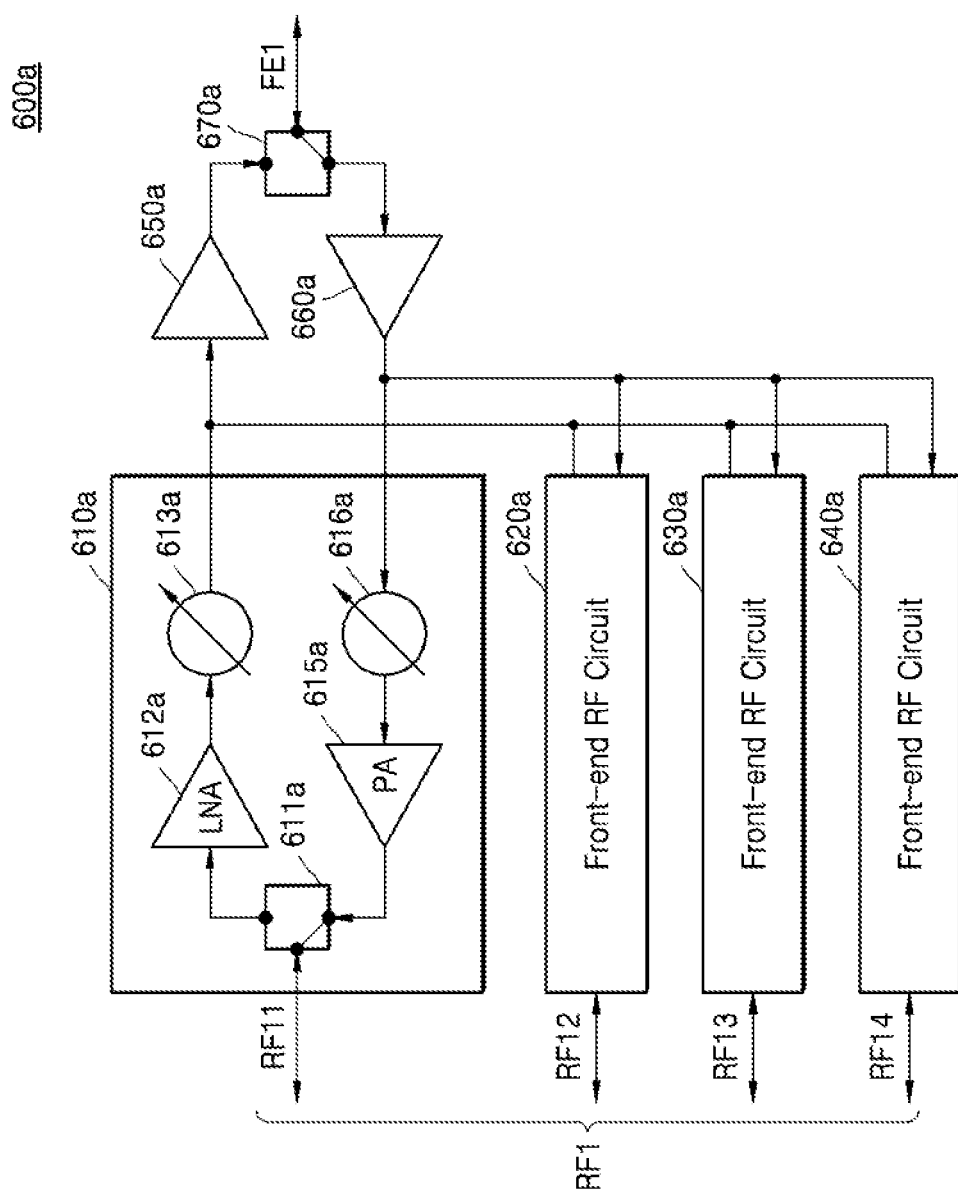
FIGS. 6A and 6B are block diagrams showing respective examples of RF circuits included in a front-end RFIC, according to embodiments.
Figure 6B:
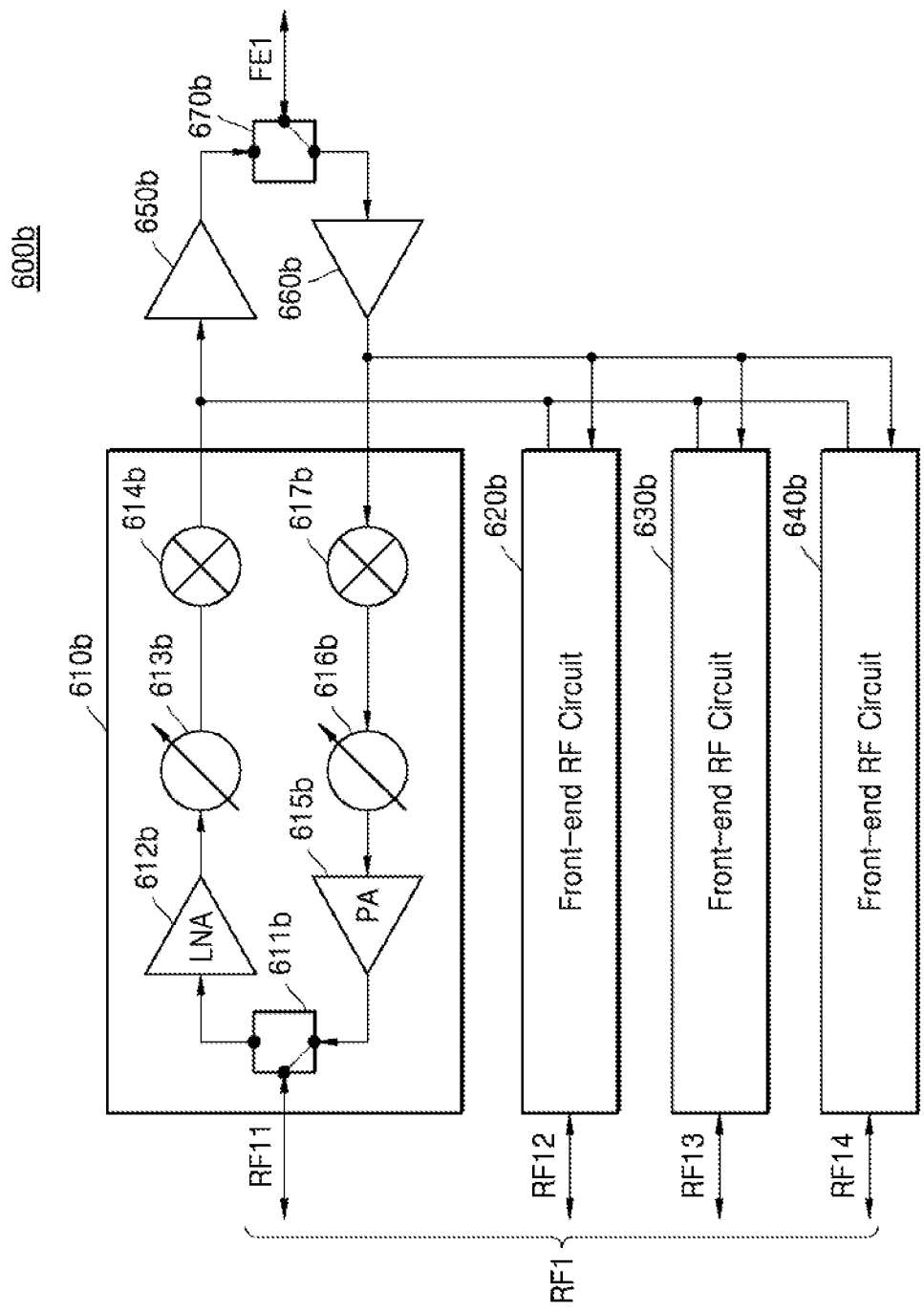

FIGS. 6A and 6B are block diagrams showing respective examples of first RF circuits, 600a and 600b, included in a front-end RFIC, according to embodiments. In particular, FIGS. 6A and 6B illustrate examples of the first RF circuit 421 of FIG. 4 that processes or generates the first RF signal RF1 polarized in the first direction. According to some embodiments, the second RF circuit 422 that processes or generates the second RF signal RF2 polarized in the second direction may have a structure similar to that shown in FIGS. 6A and 6B. In FIGS. 6A and 6B, the first RF circuits 600a and 600b may communicate with four antennas included in a phased array, and accordingly, the first RF signal RF1 may include four RF signals RF11 through RF14 polarized in the first direction. Hereinafter, FIGS. 6A and 6B are described with reference to FIG. 4, and redundant descriptions with reference to FIG. 4 will be omitted.

Referring to FIG. 6A, the first RF circuit 600a may include four front-end RF circuits 610a, 620a, 630a and 640a, RX and TX buffers 650a and 660a, and a transmit/receive (T/R) switch 670a. The four front-end RF circuits 610a through 640a may respectively process or generate the four RF signals RF11 through RF14 and may be connected to the buffers 650a and 660a. According to some embodiments, the four front-end RF circuits 610a through 640a may each have the same structure. The front-end RF circuit 610a will be described with reference to FIG. 6A.

As shown in FIG. 6A, the front-end RF circuit 610a may transmit or receive the RF signal RF11 among the first RF signal RF1 and may include a T/R switch 611a, a low-noise amplifier (LNA) 612a, an RX phase shifter 613a, a power amplifier (PA) 615a, and a TX phase shifter 616a. Although not illustrated, according to some embodiments, the front-end RF circuit 610a may further include at least one filter.

The T/R switch 611a may provide the RF signal RF11 to the LNA 612a in a reception mode while outputting an output signal of the PA 615a as the RF signal RF11 in a transmission mode. FIG. 6A illustrates an example of the T/R switch 611a in a switch position of the transmission mode, and according to some embodiments, the switch 611a may have a single pole double throw (SPDT) structure. In the reception mode, the LNA 612a may amplify the RF signal RF11 received from the T/R switch 611a, and the RX phase shifter 613a may shift a phase of an output signal of the LNA 612a. An output signal of the RX phase shifter 613a may be provided to the RX buffer 650a. In the transmission mode, the TX phase shifter 616a may shift a phase of a signal received from the TX buffer 660a, and the PA 615a may amplify an output signal of the TX phase shifter 616a. An output signal of the PA 615a may be output as the RF signal RF11 through the T/R switch 611a.

In the reception mode, the RX buffer 650a may buffer (or amplify) output signals provided from the four front-end RF circuits 610a through 640a, and an output signal of the RF buffer 650a may be provided to the switch 670a. In the transmission mode, the TX buffer 660a may buffer (or amplify) a signal provided from the T/R switch 670a, and an output signal of the TX buffer 660a may be provided to the four front-end RF circuits 610a through 640a. The switch 670a may provide paths of different signals according to the transmission signal and the reception signal, similarly to the T/R switch 611a included in the front-end RF circuit 610a. For example, the T/R switch 670a may output an output signal of the RX buffer 650a as the first front-end signal FE1 in the reception mode, while providing the first front-end signal FE1 to the TX buffer 660a in the transmission mode.

The first RF circuit 600a may process or generate the first front-end signal FE1 in an RF band. For example, the first RF circuit 600a may generate the first front-end signal FE1 in the RF band by processing the first RF signal RF1 in the RF band in the reception mode while generating the first RF signal RF1 in the RF band by processing the first front-end signal FE1 in the RF band in the transmission mode. Accordingly, internal signals (for example, the first and second internal signals INT1 and INT2 of FIG. 4) transferred between an antenna module (for example, the antenna module 400 of FIG. 4) including the first RF circuit 600a of FIG. 6A and a back-end RFIC (for example, the back-end RFIC 300 of FIG. 4) may be in an RF band.

Referring to FIG. 6B, the first RF circuit 600b may include four front-end RF circuits 610b through 640b, RX and TX buffers 650b and 660b, and a T/R switch 670b. The front-end RF circuit 610b may transmit or receive the RF signal RF11 among the first RF signal RF1 and may include a T/R switch 611b, an LNA 612b, an RX phase shifter 613b, an RX mixer 614b, PA 615b, a TX phase shifter 616b, and a TX mixer 617b. Compared with the front-end RF circuit 610a of FIG. 6A, the front-end RF circuit 610b of FIG. 6B further includes the RX mixer 614b and the TX mixer 617b. Although not illustrated, according to some embodiments, the front-end RF circuit 610b may further include at least one filter.

In a reception mode, the RF signal RF11 may be provided to the LNA 612b through the switch 611b and processed sequentially by the 612b, the RX phase shifter 613b, and the RX mixer 614b. According to some embodiments, the RX mixer 614b may down-convert an output signal of the RX phase shifter 613b in an RF band to a signal in an intermediate frequency (IF) band. An IF band may denote an arbitrary band between an RF band and baseband. An output signal of the RX mixer 614b may be provided to the RX buffer 650b, and an output signal of the RX buffer 650b may be output as the first front-end signal FE1 through the switch 670b. Accordingly, the first front-end signal FE1 may be in the IF band in the reception mode.

In a transmission mode, the first front-end signal FE1 may be provided to the TX mixer 617b of the front-end RF circuit 610b through the switch 670b and may be sequentially processed by the TX mixer 617b, the TX phase shifter 616b, and the PA 615b. According to some embodiments, the first front-end signal FE1 provided to the switch 670b may be in the IF band, and the TX mixer 617b may up-convert the output signal of the TX buffer 660b in the IF band to a signal in an RF band. An output signal of the PA 615b may be output as the RF signal RF11 by the switch 611b.

As described above, unlike the first RF circuit 600b of FIG. 6A, the first RF circuit 600b may process or generate the first front-end signal FE1 in the IF band. For example, the first RF circuit 600b may generate the first front-end signal FE1 in the IF band by processing the first RF signal RF1 in the RF band in the reception mode, while generating the first RF signal RF1 in the RF band by processing the first front-end signal FE1 in the IF band in the transmission mode. Accordingly, internal signals (for example, the first and second internal signals INT1 and INT2 of FIG. 4) transferred between an antenna module (for example, the antenna module 400 of FIG. 4) including the first RF circuit 600b of FIG. 6B and a back-end RFIC (for example, the back-end RFIC 300 of FIG. 4) may be in an IF band.

Figure 7A:
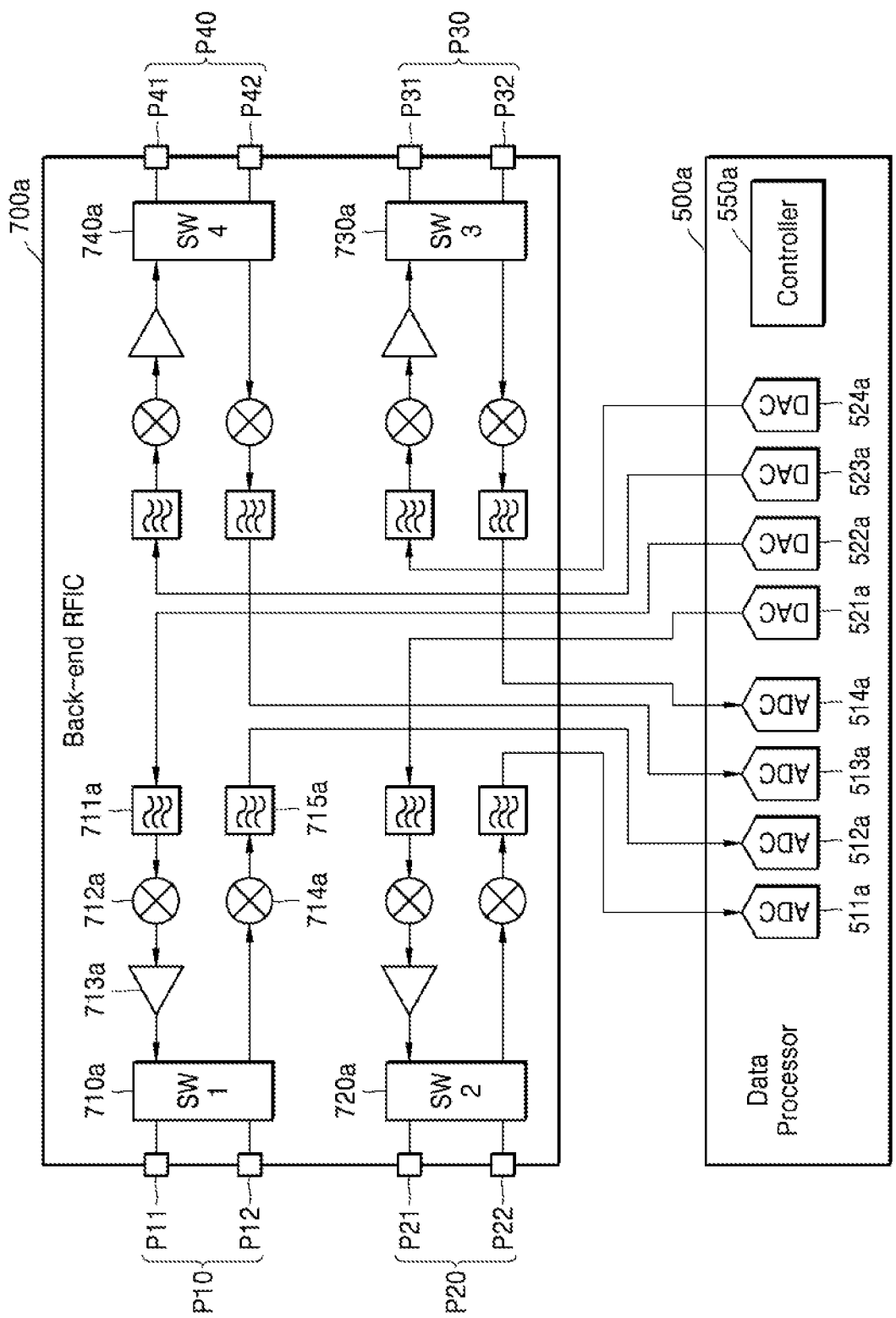
FIGS. 7A and 7B are block diagrams showing respective examples of a back-end RFIC and a data processor, according to embodiments.
Figure 7B:
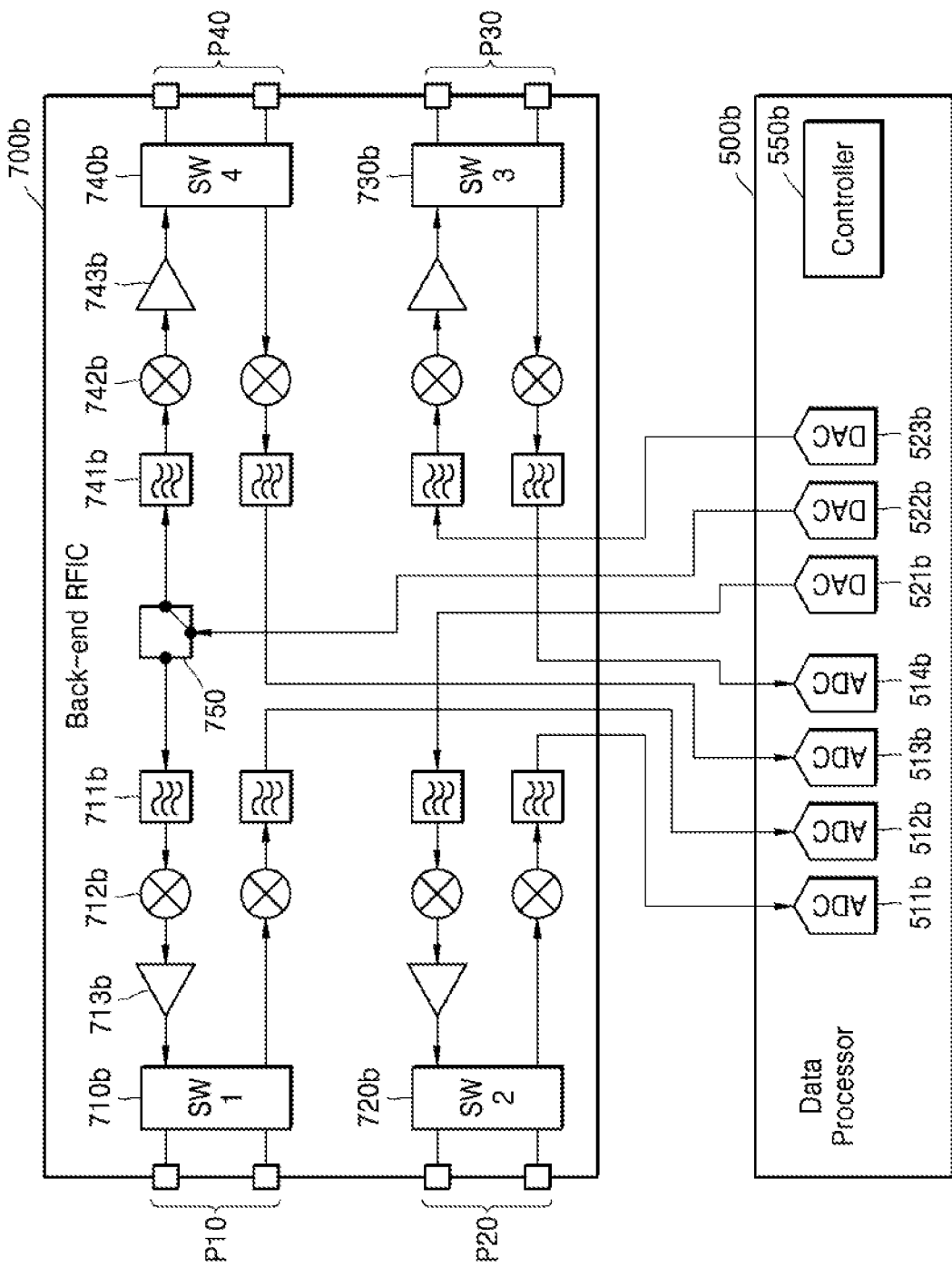

FIGS. 7A and 7B are block diagrams showing respective examples of back-end RFICs 700a and 700b and data processors 500a and 500b, according to embodiments. In FIGS. 7A and 7B, baseband signals may be transmitted/received between the back-end RFICs 700a, 700b and the data processors 500a, 500b. Hereinafter, redundant descriptions will be omitted while describing FIGS. 7A and 7B.

Referring to FIG. 7A, the back-end RFIC 700a may include four port pairs, i.e., first through fourth port pairs P10 through P40, for connecting to antenna modules. For example, the first port pair P10 may include first port P11 and a second port P12 that may be respectively connected to ports of an antenna module (for example, the first and second ports 441 and 442 of FIG. 4). According to some embodiments, the first and second ports P11 and P12 may be differential ports for differential signals. Similarly, the second port pair P20 may include first and second ports P21 and P22, the third port pair P30 may include first and second ports P31 and P32, and the fourth port pair P40 may include first and second ports P41 and P42, in embodiments, the ports P11, P12, etc. may interface with RF or IF transmission lines such as microstrip.

The back-end RFIC 700a may include four circuit groups corresponding to the first through fourth port pairs P10 through P40. As shown in FIG. 7A, the back-end RFIC 700a may include first through fourth switches 710a, 720a, 730a, 740a respectively connected to the first through fourth port pairs P10, P20, P30 and P40 and may include circuits for processing a signal between the first though fourth switches 710a through 740a and the data processor 500a. For example, a baseband signal received from a DAC 522a of the data processor 500a may be processed by a TX filter 711a, a TX mixer 712a, and an amplifier 713a, and an output signal of the amplifier 713a may be provided to the first switch 710a. According to some embodiments, the amplifier 713a may include a variable gain amplifier (VGA). Also, a signal received from the first switch 710a may be processed by an RX mixer 714a and an RX filter 715a, and an output signal of the RX filter 715a may be provided to an ADC 513a of the data processor 500a. Although not illustrated, according to some embodiments, the back-end RFIC 700a may include a circuit, e.g., a phased locked loop (PLL), that provides an oscillating signal to the RX filter 715a and the TX mixer 712a. Further, the data processor 500a, 500b may be configured to perform MIMO processing with respect to at least one of the first RF signal RF1 and the second RF signal RF2.

According to some embodiments, as described above with reference to FIG. 6A, when the back-end RFIC 700a receives an internal signal in an RF band from an antenna module or provides an internal signal in an RF band to an antenna module, the TX mixer 712a may up-convert a signal in baseband to an RF band, and the RX mixer 714a may down-convert a signal in an RF band to baseband. On the other hand, according to some embodiments, as described above with reference to FIG. 7B, when the back-end RFIC 700a receives an internal signal in an IF band from an antenna module or provides an internal signal in an IF band to an antenna module, the TX mixer 712a may up-convert a signal in baseband to an IF band, and the RX mixer 714a may down-convert a signal in an IF band to baseband.

According to some embodiments, each of the first through fourth switches 710a through 740a may be a 4-way switch as described above in connection with FIGS. 4, 5A and 5B. For example, the first switch 710a may connect each of the first and second ports P11 and P12 to the amplifier 713a or the RX mixer 714a according to a control signal. Also, according to some embodiments, the first switch 710a may mutually exclusively connect the first and second ports P11 and P12 to the amplifier 713a and the RX mixer 714a according to a control signal, similarly to the switch circuit 430 of FIG. 4 described with reference to FIGS. 5A and 5B. Accordingly, a signal received by the back-end RFIC 700a from an antenna module may be processed after passing through any one of the first and second ports P11 and P12, and a signal transmitted from the back-end RFIC 700a to an antenna module may also pass through any one of the first and second ports P11 and P12. According to some embodiments, the 4-way switch may include a plurality of 2-way switches that are hierarchically connected in a known manner. Further, if any of the switches 710a to 740a is configured to have the third, fourth, fifth and/or sixth switching states as described above, one of the switching paths through the switch may be controlled to be open while the other one is closed, according to a control signal state.

The data processor 500a may include a plurality of ADCs 511a, 512a, 513a and 514a, a plurality of DACs 521a, 522a, 523a, and 524a, and a controller 550a. Each of the ADCs 511a through 514a may receive a baseband signal from the back-end RFIC 700a and convert the baseband signal to a digital signal. Each of the DACs 521a through 524a may generate a baseband signal by converting a digital signal and provide the baseband signal to the back-end RFIC 700a. In FIG. 7A, the data processor 500a may include four ADCs 511a through 514a and four DACs 521a through 524a, which correspond to the second, first, fourth, and third port pairs P20, P10, P40 and P30, respectively.

The controller 550a may generate at least one control signal and provide the control signal not only to the back-end RFIC 700a, but also to a plurality of antenna modules (e.g., the antenna modules 110-140 of FIG. 1). For example, the controller 550a may generate a control signal indicating a transmission mode or a reception mode, and a T/R switch of an antenna module (for example, the T/R switch 611a and/or 670a of FIG. 6A) may set a path of a signal in response to the control signal. Also, the controller 550a may generate a control signal such that a signal path is formed with an antenna module providing satisfactory communication among a plurality of antenna modules, and a switch of an antenna module (e.g., the switch circuit 430 of FIG. 4) and a switch of the back-end RFIC 700a (e.g., the switch 710a) may set a path of a signal in response to the control signal. Examples of operations of the controller 550a will be described later with reference to FIGS. 9 and 10.

In the embodiment of FIG. 7A, four receive paths are provided and four transmission paths are provided to handle a total of eight receive signals that may be selectively provided by the four antenna modules 110-140 and eight potential transmit signals that may be provided to the antenna modules 110-140. This is because each antenna module 110-140 may only provide RF signals of one selected polarization during the receive mode, and transmit signals of one selected polarization in the transmit mode. In this manner, the number of connections between the antenna modules 110-140 and the back-end RFIC 150 (or 300) may be reduced by half (as compared to the case where signals of all polarizations are continually routed to a demodulator on receive and continually provided to the antenna modules 110-140 on transmit).

For instance, referring to FIGS. 1, 4 and 7A, consider that antenna module 110 with the configuration of antenna module 400 is connected to port pair P10 by a connection of port 441 to port P11 and port 440 to port P12. In a receive mode, if a receive signal of a first polarization is selected, e.g. signal RF1, and the switch circuit 430 is in the straight path switching state, the signal RF1 is output as signal INT1, which is applied to port P11. If switch 710a is in the fifth switching state, the signal INT1 will be routed in the receive path comprising mixer 714a, filter 715a and ADC 512a, thereby being routed for demodulation. Concurrently, the signal energy of receive signal RF2 of the second polarization will not pass through the switch 710a. On the other hand, if the signal of the second polarization is selected, e.g., signal RF2, the switch 430 may remain in the straight path state while the state of switch 710a may be changed to the fourth switching state, in which the signal INT2 (corresponding to signal RF2) passes to the receive path with mixer 714a while the signal INT1 does not pass through switch 710a. Similar switching schemes may be applied in the transmit mode.

Referring to FIG. 7B, the back-end RFIC 700b may include the first through fourth port pairs P10 through P40 in a similar arrangement to the back-end RFIC 700a of FIG. 7A. Also, the back-end RFIC 700b may include four switches 710b through 740b respectively corresponding to the first through fourth port pairs P10 through P40. Compared with the back-end RFIC 700a of FIG. 7A, the back-end RFIC 700b may further include an SPDT switch 750. As shown in FIG. 7B, the SPDT switch 750 may receive a baseband signal from a DAC 522b of the data processor 500b and may provide the received baseband signal to a TX filter 711b corresponding to the first port pair P10 or a TX filter 741b corresponding to the fourth port pair P40 according to a control signal.

The data processor 500b may include four ADCs 511b through 514b and a controller 550b, like the data processor 500a of FIG. 7A, and may include three DACs 521b through 523b unlike the data processor 500a of FIG. 7A. In other words, a baseband signal output by the DAC 523b of FIG. 7B may be processed by the back-end RFIC 700b and output through the first port pair P10 or the fourth port pair P40. Also, the controller 550b may provide a control signal to the SPDT switch 750 of the back-end RFIC 700b.

In the example of FIG. 7B, the path from the SPDT 750 to the switch 740b is shown to include the filter 741b, a mixer 742b and an amplifier 743b; and the path from the SPDT 750 to the switch 710b is shown to include the filter 711b, a mixer 712b and an amplifier 713b. In an alternative embodiment, the path from DAC 522b may be connected directly to the input of filter 711b, and the spur switch 750 may be placed in between the output of amplifier 713b and the input to switch 710b. The input of switch 750 would then connect to the output of amplifier 713b; a first output of SPDT switch 750 would connect to one input of switch 710b; and the second output of SPDT switch 750 could then connect directly to one input of switch 740b. In this case, filter 741b, mixer 742b and amplifier 743b may be omitted (for the case in which these components are otherwise designed to have identical characteristics as filter 711b, mixer 712b and amplifier 713b). Similarly, the left-side elements 711b, 712b and 713b could alternatively be omitted while the right-side elements remain, if the switch 750 were to be connected between the output of amplifier 743b and one input of switch 740b.

Figure 8:
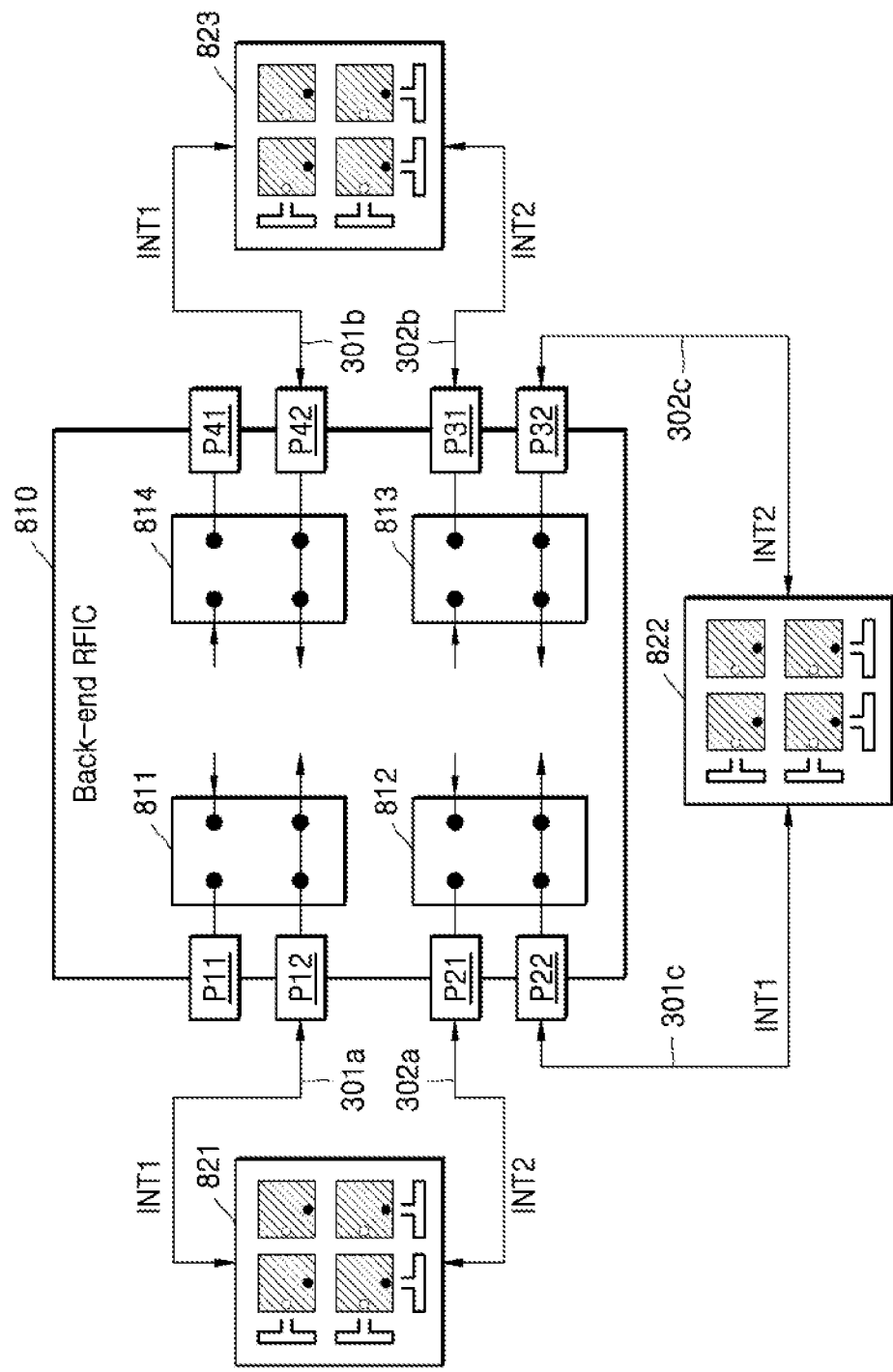
FIG. 8 is a block diagram showing a back-end RFIC and antenna modules, according to an embodiment.

FIG. 8 is a block diagram showing a back-end RFIC 810 and first through third antenna modules 821 through 823, according to an embodiment. In particular, as described above with reference to FIGS. 7A and 7B, FIG. 8 illustrates first through third antenna modules 821, 822 and 823 and the back-end RFIC 810 including four port pairs and illustrates first through fourth switches 811 through 814 in which a signal path is set according to a control signal in a reception mode. Back-end RFIC 810 is an example of back-end RFIC 150 of FIG. 1; and antenna modules 821, 822 and 823 are examples of any three of antenna modules 110, 120, 130 and 140. In the embodiment of FIG. 8, a fourth antenna module may be omitted from user equipment (UE) within which the back-end RFIC 810 and antenna modules 821-823 are included (thus, the UE may have exactly three antenna modules).

Referring to FIG. 8, the back-end RFIC 810 may include the four port pairs, i.e., eight ports, and the first through fourth switches 811 through 814. According to some embodiments, each of the first through fourth switches 811 through 814 may be a 4-way switch and may be connected to one pair of ports. In FIG. 8, the eight ports may be the first and second ports P11 and P12 of the first switch 811, the first and second ports P21 and P22 of the second switch 812, the first and second ports P31 and P32 of the third switch 813, and the first and second ports P41 and P42 of the fourth switch 814. In FIG. 8, example switching states of the switches 811-814 are shown for a reception mode.

Each of the first through third antenna modules 821 to 823 may include a phased array and a front-end RFIC, wherein the phased array may communicate a signal polarized in a first direction, e.g., a horizontal direction, and a signal polarized in a second direction, e.g., a vertical direction. Accordingly, each of the first through third antenna modules 821 through 823 may be connected to the back-end RFIC 810 through a line 301a, 301b or 301c for a signal polarized in a horizontal (H) direction and a line 302a, 302b or 302c for a signal polarized in a vertical (V) direction. (If the switching states of the 4-way switches 430 in FIG. 4 are changed in any of the antenna modules 821-823, e.g., as a result of signal power measurements discussed below, H may be swapped with V on the respective lines 301, 302.)

According to some embodiments, each of the first through third antenna modules 821-823 may be connected to the back-end RFIC 810 through ports of different port pairs. For example, as shown in FIG. 8, the first antenna module 821 may be connected to the second port P12 of the first switch 811 and the first port P21 of the second switch 812, the second antenna module 822 may be connected to the second port P22 of the second switch 812 and the first port P31 of the third switch 813, and the third antenna module 823 may be connected to the first port P31 of the third switch 813 and the second port P42 of the fourth switch 814. Accordingly, as shown in FIG. 8, signals polarized in a horizontal direction may be received from the first and third antenna modules 821 and 823, while a signal polarized in a vertical direction and a signal polarized in a horizontal direction may be received from the second antenna module 822.

According to some embodiments, each of the first through third antenna modules 821 through 823 may include a switch circuit (for example, the switch circuit 430 of FIG. 4). Accordingly, each of the first through third antenna modules 821 through 823 may communicate with the back-end RFIC 810 such that each of an internal signal corresponding to a signal polarized in a horizontal direction and an internal signal corresponding to a signal polarized in a vertical direction passes through different switches of the back-end RFIC 810 according to a control signal.

For instance, referring collectively to FIGS. 4 and 8, considering antenna module 821 embodied as antenna module 400, port 441 may connect to port P12 via line 301a, and port 442 may connect to port P21 via line 302a. As shown in FIG. 8, if the internal signal INT1 is H (corresponding to received signal RF1 and a straight path connection state of switch 430), the signal RF1 may be routed for demodulation by the back-end RFIC 810 whereas the received signal RF2 (corresponding to internal signal INT2) is not routed for demodulation. On the other hand, if the switching state of switch 430 is changed to the "crossed state", the signal RF2 may be routed for demodulation whereas the signal RF1 is not routed for demodulation. A similar switching operation may be performed within antenna module 823.

Figure 9:
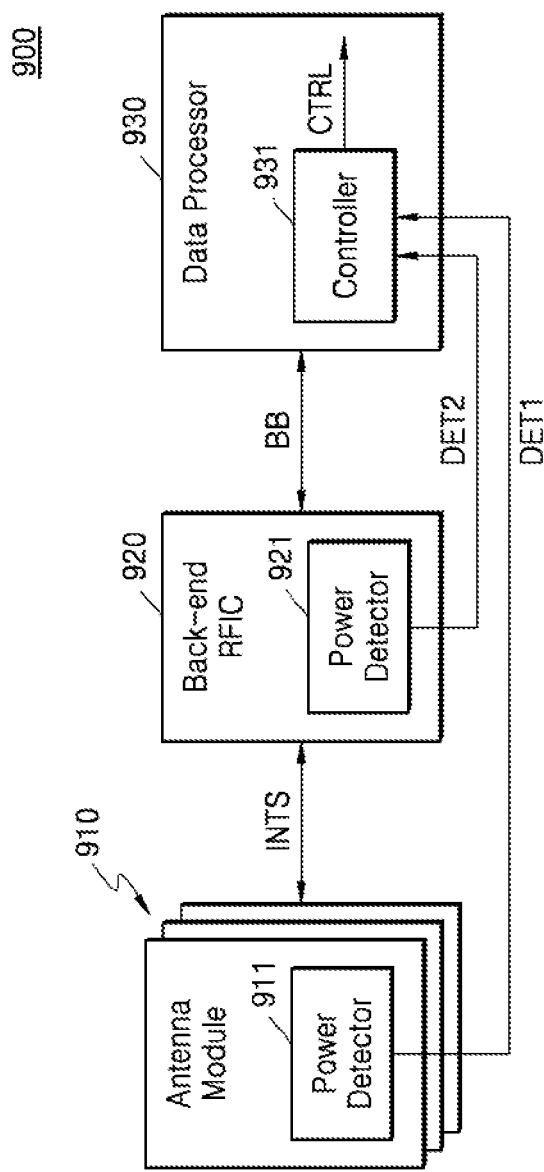
FIG. 9 is a block diagram of a communication device according to an embodiment.

FIG. 9 is a block diagram of a communication device 900 according to an embodiment. As shown in FIG. 9, the communication device 900 may include a plurality of antenna modules 910, a back-end RFIC 920, and a data processor 930.

The plurality of antenna modules 910 may each include a phased array and a front-end. RFIC as described above with reference to FIG. 1 and may be spaced apart from each other at an edge of the communication device 900. Also, the plurality of antenna modules 910 may communicate with the back-end RFIC 920 through a plurality of internal signals INTS. According to some embodiments, as shown in FIG. 9, the plurality of antenna modules 910 may each include a power detector 911. The power detector 911 may be connected to a signal path in the antenna module 910 in parallel, detect power of a signal moving through the signal path, and provide a first detection signal DET1 to the data processor 930 based on the detected power.

The back-end RFIC 920 may communicate with the plurality of antenna modules 910 through the plurality of internal signals INTS and with the data processor 930 through a baseband signal BB. According to some embodiments, as shown in FIG. 9, the back-end RFIC 920 may include a power detector 921. The power detector 921 may be connected to a signal path in the back-end RFIC 920 in parallel and provide a second detection signal DET2 to the data processor 930 by detecting power of a signal moving through the signal path.

The data processor 930 may communicate with the back-end RFIC 920 through the baseband signal BB and receive the first and second detection signals DET1 and DET2 respectively from the plurality of antenna modules 910 and the back-end RFIC 920. A controller 931 may generate a control signal CTRL based on the first and second detection signals DET1 and DET2. An operation of the controller 931 generating the control signal CTRL will be described below with reference to FIG. 10.

According to some embodiments, the control signal CTRL may be provided to the plurality of antenna modules 910 and the back-end RFIC 920 through at least one of the lines through which the plurality of internal signals INTS and the baseband signal BB are transmitted. For example, the control signal CTRL may be provided to switches (for example, the switch 710a etc. of FIG. 7A) included in the back-end RFIC 920 through a same line as the baseband signal BB while the baseband signal BB is not transmitted between the back-end RFIC 920 and the data processor 930. Also, after being transmitted to the back-end RFIC 920 through the same line as the baseband signal BB, the control signal CTRL may be provided to the switches (for example, the switch 611a etc. of FIG. 6A) included in the plurality of antenna modules 910 and/or switch circuits (for example, the switch circuit 430 of FIG. 4) through the same lines as the plurality of internal signals INTS while the plurality of internal signals INTS are not transmitted between the plurality of antenna modules 910 and the back-end RFIC 920. For example, the switch circuit 430 included in the antenna module 400 of FIG. 4 may receive the control signal CTRL through the first port 441 and/or the second port 442. (These ports may connect to signal conductors of an RF or IF transmission line.)

According to some embodiments, the first and second detection signals DET1 and DET2 may be provided to the data processor 930 through at least one of the lines through which the plurality of internal signals INTS and the baseband signal BB are transmitted. For example, the second detection signal DET2 generated by the power detector 921 included in the back-end RFIC 920 may be provided to the data processor 930 through a same line as the baseband signal BB while the baseband signal BB is not transmitted between the back-end RFIC 920 and the data processor 930. Also, the first detection signal DET1 generated by the power detector 911 included in the antenna module 910 may be provided to the back-end RFIC 920 through same lines as the plurality of internal signals INTS while the plurality of internal signals INTS are not transmitted between the plurality of antenna modules 910 and the back-end RFIC 920 and provided to the data processor 930 through the same line as the baseband signal BB like the second detection signal DET2.

Figure 10:
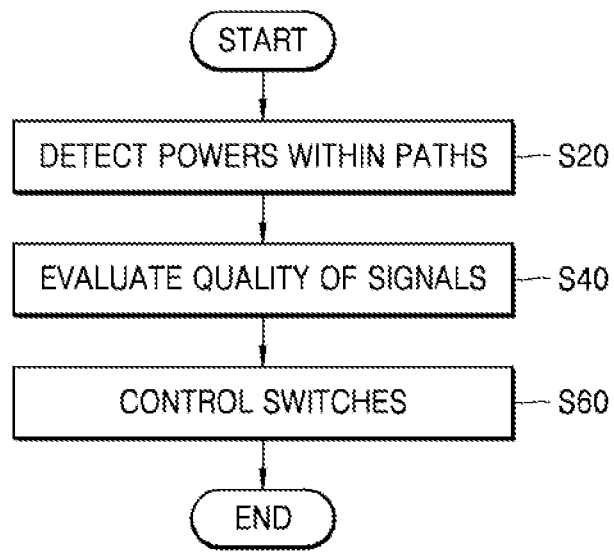
FIG. 10 is a flowchart of an operating method of a communication device, according to an embodiment.

FIG. 10 is a flowchart of an operating method of a communication device, according to an embodiment. In particular, FIG. 10 illustrates an operating method of a communication device including a plurality of antenna modules and a back-end RFIC. For example, the operating method of FIG. 10 may be performed by the communication device 900 of FIG. 9 and will be described with reference to FIG. 9.

Referring to FIG. 10, in operation S20, powers of paths may be detected. For example, the power detector 911 included in the antenna module 910 may detect signal powers within signal paths in the antenna module 910, for example, a path through which a signal polarized in a first direction propagates, a path through which a signal polarized in a second direction propagates, and paths corresponding to a plurality of antennas of a phased array. Also, the power detector 921 included in the back-end RFIC 920 may detect powers within signal paths in the back-end RFIC 920, for example, signal paths corresponding to the plurality of antenna modules 910. The first and second detection signals DET1 and DET2 generated by detecting the powers may be provided to the controller 931 of the data processor 930.

In operation S40, quality of signals may be evaluated. For example, the controller 931 may evaluate quality of signals propagating through the paths based on the first and second detection signals DET1 and DET2. According to some embodiments, the controller 931 may calculate a signal-to-noise ratio (SNR) and determine which path carries a signal having satisfactory quality based on the SNR.

In operation S60, switches may be controlled. For example, the controller 931 may generate at least one control signal such that communication is performed through a path through which a signal having satisfactory quality moves while communication through a path through which a signal having unsatisfactory quality moves is blocked. Accordingly, switches (for example, the switch 611a etc. of FIG. 6A) included in the plurality of antenna modules 910 and/or switch circuits (for example, the switch circuit 430 of FIG. 4) may be controlled, and switches (for example, the switch 710a etc. of FIG. 7A) included in the back-end RFIC 920 may be controlled.

Figure 11:
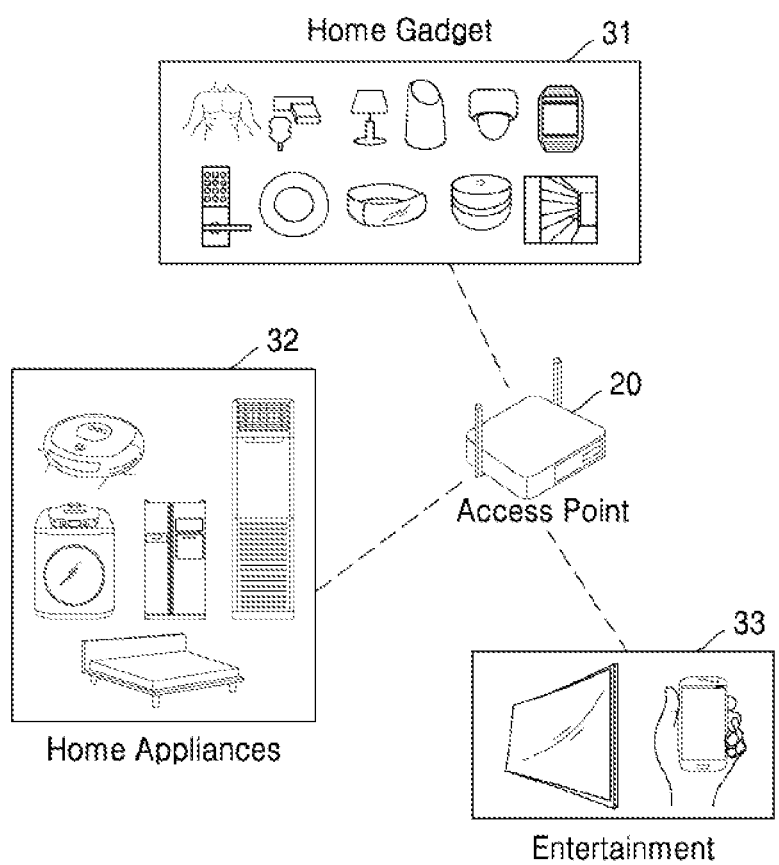
FIG. 11 is a block diagram showing examples of a communication device including an antenna module, according to an embodiment.

FIG. 11 is a block diagram showing examples of a communication device including a plurality of antenna modifies, according to an embodiment. In particular, FIG. 11 illustrates an example in which various wireless communication devices communicate with each other in a wireless communication system using WLAN. Unlike the wireless communication system 5 of FIG. 1 using a cellular network, the wireless communication devices of FIG. 11 may communicate with each other through WLAN.

According to some embodiments, a home gadget 31, a home appliance 32, an entertainment device 33, and an access point (AP) 20 may form an Internet of things (IoT) network system. Each of the home gadget 31, the home appliance 32, the entertainment device 33, and the AP 20 may include a plurality of antenna modules and a back-end RFIC according to one or more embodiments. The home gadget 31, the home appliance 32, and the entertainment device 33 may communicate with the AP 20 wirelessly, and the home gadget 31, the home appliance 32, and the entertainment device 33 may communicate with each other.

The terms used in the present specification are merely used to describe particular embodiments, and are not intended to limit the scope of the inventive concept. While the inventive concept has been particularly shown and described with reference to embodiments thereof, it will be understood that various changes in form and details may be made therein without departing from the spirit and scope of the following claims.

What is claimed is:

1. An antenna module comprising:
   a phased array comprising a plurality of antennas and configured to communicate a first radio frequency (RF) signal and a second RF signal, which are polarized in different directions;
   a front-end radio frequency integrated circuit (RFIC) comprising a first RF circuit configured to process or generate the first RF signal and a second RF circuit configured to process or generate the second RF signal; and
   a switch circuit configured to connect each of the first circuit and the second RF circuit to a first port or a second port of the antenna module according to a control signal, the first and second ports each being connectable to a back-end RFIC that processes or generates a baseband signal.

2. The antenna module of claim 1, wherein the switch circuit is further configured to connect the first and second RF circuits to the first and second ports, respectively, in response to a first state of the control signal, and to connect the first and second RF circuits to the second and first ports, respectively, in response to a second state of the control signal.

3. The antenna module of claim 1, wherein each of the first RF circuit and the second RF circuit comprises at least one of a power amplifier, a low-noise amplifier, and a phase shifter.

4. The antenna module of claim 1, wherein each of the first RF circuit and the second RF circuit comprises at least one mixer configured to convert a signal between an RF band and an intermediate frequency (IF) band, and
   the switch circuit is further configured to pass a signal of an IF band.

5. The antenna module of claim 1, wherein each of the first RF circuit and the second RF circuit comprises at least one switch configured to connect to the switch circuit and form different respective signal paths in transmission and reception modes.

6. The antenna module of claim 1, wherein the switch circuit is configured to receive the control signal from the first port or the second port.

7. The antenna module of claim 1, wherein the antenna module comprises first and second substrates in a stacked configuration, the phased array is provided on or within the first substrate, the front-end RFIC is provided on or within the second substrate, and
   wherein the antenna module further comprises a plurality of feed lines through which the first RF signal and the second RF signal pass, the feed lines disposed between the plurality of antennas and the front-end RFIC.

8. A communication device comprising:
   first and second signal lines;
   a back-end radio frequency integrated circuit (RFIC) configured to process or generate a baseband signal; and
   a first antenna module connected to the back-end RFIC through the first and second signal lines and comprising a phased array configured to communicate first and second RF signals polarized in different directions,
   wherein the first antenna module is configured to communicate with the back-end RFIC such that a first internal signal corresponding to the first RF signal and a second internal signal corresponding to the second RF signal each pass through the first signal line or the second signal line according to a control signal.

9. The communication device of claim 8, wherein the first antenna module is further configured to communicate with the back-end RFIC such that the first internal signal and the second internal signal are mutually exclusively transmitted through the first signal line and the second signal line according to the control signal.

10. The communication device of claim 8, wherein the first antenna module further comprises a 4-way switch connected to each of the first signal line and the second signal line.

11. The communication device of claim 8, wherein the first antenna module further comprises a front-end RFIC configured to process or generate the first RF signal and the second RF signal and to process or generate the first internal signal and the second internal signal.

12. The communication device of claim 11, wherein the front-end RFIC comprises at least one mixer configured to convert a signal between an RF band and an intermediate frequency (IF) band, and
   the back-end RFIC comprises at least one mixer configured to convert a signal between baseband and an IF band.

13. The communication device of claim 8, wherein the back-end RFIC comprises a switch configured to connect to the first signal line and the second signal line and to connect each of the first signal line and the second signal line to different paths according to a transmission mode and a reception mode.

14. The communication device of claim 8, wherein the back-end RFIC comprises at least one mixer configured to convert a signal between baseband and an RF band.

15. The communication device of claim 8, wherein the first antenna module is configured to receive the control signal through the first signal line and the second signal line.

16. The communication device of claim 8, further comprising a data processor configured to receive a baseband signal from the back-end RFIC or provide the baseband signal to the back-end RFIC and generate the control signal.

17. The communication device of claim 8, further comprising:
at least one second antenna module comprising a phased array; and
at least one line pair configured to transmit internal signals between the back-end RFIC and the at least one second antenna module.

18. The communication device of claim 17, wherein the first antenna module and the at least one second antenna module are spaced apart from each other at an edge of the communication device.

19. A communication device comprising:
a back-end radio frequency integrated circuit (RFIC) configured to process or generate a baseband signal; and
first, second and third antenna modules each comprising a phased array configured to communicate a first RF signal and a second RF signal polarized in different directions,
wherein the back-end RFIC comprises first, second, third and fourth 4-way switches,
the first antenna module is connected to a second port of the first 4-way switch and a first port of the second 4-way switch,
the second antenna module is connected to a second port of the second 4-way switch and a first port of the third 4-way switch, and
the third antenna module is connected to a second port of the third 4-way switch and a second port of the fourth 4-way switch.

20. The communication device of claim 19, wherein each of the first through third antenna modules is configured to communicate with the back-end RFIC such that a first internal signal corresponding to the first RF signal and a second internal signal corresponding to the second RF signal each pass through different 4-way switches according to a control signal.

* * * * *